(12) United States Patent
Pace et al.

(10) Patent No.: US 11,021,311 B2
(45) Date of Patent: Jun. 1, 2021

(54) VACUUM CONTAINER FOR STORAGE OF AIR SENSITIVE MATERIALS

(71) Applicant: Christian Pace, Wood-Ridge, NJ (US)

(72) Inventors: Christian Pace, Wood-Ridge, NJ (US); Luke Squeo-Pulido, Wyckoff, NJ (US)

(73) Assignee: Illmatik Concepts LLC, Wood-Ridge, NJ (US)

(*) Notice: Subject to any disclaimer, the term of this patent is extended or adjusted under 35 U.S.C. 154(b) by 173 days.

(21) Appl. No.: 16/335,498

(22) PCT Filed: Nov. 5, 2018

(86) PCT No.: PCT/US2018/059203
§ 371 (c)(1),
(2) Date: Mar. 21, 2019

(87) PCT Pub. No.: WO2019/090216
PCT Pub. Date: May 9, 2019

(65) Prior Publication Data
US 2020/0377280 A1  Dec. 3, 2020

Related U.S. Application Data

(60) Provisional application No. 62/581,165, filed on Nov. 3, 2017.

(51) Int. Cl.
B65D 81/20 (2006.01)
B65D 51/18 (2006.01)
(Continued)

(52) U.S. Cl.
CPC .......... *B65D 81/2038* (2013.01); *A47J 41/02* (2013.01); *B65D 43/0225* (2013.01);
(Continued)

(58) Field of Classification Search
CPC .......................... B65D 81/2038; B65D 51/18
(Continued)

(56) References Cited

U.S. PATENT DOCUMENTS

| 3,129,835 A | 4/1964 | Collens |
| 4,823,968 A * | 4/1989 | Handzlik ............. B65B 31/047 215/228 |

(Continued)

FOREIGN PATENT DOCUMENTS

WO   2014/144912 A1   9/2014

*Primary Examiner* — James N Smalley
*Assistant Examiner* — Jennifer Castriotta
(74) *Attorney, Agent, or Firm* — Andrew Berks (57) ABSTRACT

A storage container apparatus is provided for storing air sensitive materials under a vacuum. The apparatus includes having a cylindrical container body opened at its upper end and a cap apparatus with an integral air pump to evacuate air from the container body to create a vacuum. The cap apparatus comprises an inner cap with a one-way air valve and an outer cap. The outer cap is slidably nested over the inner cap and confines a central air chamber which fills with air from the container body through the one-way air valve when pulled upwardly in a reciprocating motion. In the down stroke the air is evacuated from the air chamber through vents. The outer cap may include locking mechanism and vacuum level indicator. The outer cap may include an activated carbon cloth insert that suppresses odors from the material stored in the container.

9 Claims, 8 Drawing Sheets (51) Int. Cl.
*A47J 41/02* (2006.01)
*B65D 43/02* (2006.01)
*B65D 50/04* (2006.01)
*B65D 51/24* (2006.01)

(52) U.S. Cl.
CPC .......... *B65D 50/041* (2013.01); *B65D 51/18* (2013.01); *B65D 51/248* (2013.01); *B65D 2215/02* (2013.01); *B65D 2251/0081* (2013.01)

(58) Field of Classification Search
USPC ............ 206/524.8; 220/203.27, 203.29, 231; 215/260, 262
See application file for complete search history.

(56) References Cited

U.S. PATENT DOCUMENTS

| | | | |
|---|---|---|---|
| 5,957,317 A | 9/1999 | Lee | |
| 5,992,666 A * | 11/1999 | Wu | B65B 31/047 215/228 |
| 6,264,054 B1 * | 7/2001 | Miyake | B65D 81/2038 220/23.83 |
| 6,375,024 B1 * | 4/2002 | Park | B65B 31/047 215/228 |
| 8,936,169 B2 * | 1/2015 | Lui | B65D 81/2015 220/212 |
| 8,967,413 B2 | 3/2015 | Tinstman et al. | |
| 2003/0183657 A1 * | 10/2003 | Chang | B65D 81/2038 222/383.1 |
| 2005/0051551 A1 * | 3/2005 | Galletti | B65D 81/2038 220/212 |
| 2006/0102659 A1 * | 5/2006 | Marr | C12H 1/16 222/207 |
| 2016/0297597 A1 * | 10/2016 | Lee | F16K 7/20 |
| 2018/0222660 A1 * | 8/2018 | Krus | B65D 43/0202 |

* cited by examiner

VACUUM CONTAINER FOR STORAGE OF AIR SENSITIVE MATERIALS

CROSS-REFERENCE TO RELATED APPLICATIONS

This application is the U.S. National Stage of PCT application No. PCT/US18/59203, filed Nov. 5, 2018, which claims priority to U.S. Provisional Patent Application 62/581,165, filed on Nov. 3, 2017.

FIELD OF THE INVENTION

This invention pertains to storage containers for storing air sensitive materials, and more particularly to containers with a cap providing an airtight closure and an integral air pump that manually evacuates air from the storage area.

BACKGROUND

A variety of devices exist to store food, herbs, drugs, or other air sensitive materials under vacuum to prevent or delay oxidation and spoilage.

In the field of small devices for personal use to store air sensitive materials, see for example, U.S. Pat. No. 5,597,317, which describes a vacuum storage container with a complex pumping mechanism in the cap. Similarly, U.S. Pat. No. 8,936,169 discloses a vacuum storage container with a pumping mechanism in the cap.

These devices, however, have plurality of venting holes or pressure release valve structure or equivalent mechanism, which allows a user to equalize pressure or release a vacuum without removing the lid from the container or. These structures are more complex, add unnecessary cost and require more surface area to accommodate pressure release elements or venting holes.

Likewise, devices have been disclosed for drawing vacuum in an opened wine bottle, that incorporate a pump in a cap that fits on a wine bottle (WO2014/144912 and US2006/0102659, "Vacu-Vin"). These devices, however, do not form an integral part of the bottle cap and are intended to be removed once the air from the bottle is evacuated.

SUMMARY OF THE INVENTION

This invention provides a container for storing an air sensitive solid material in which the container has a cylindrical body for storing an air sensitive solid material and a cap having a pumping apparatus. The cap apparatus has means to pump air out of the container to provide a vacuum within the chamber to prolong to storage life and freshness of the air sensitive material. The cap apparatus is intended to remain with the container during storage.

In an embodiment, the cap apparatus has an inner and outer cap. The inner cap may have a threaded connection to a mouth portion of the container body, wherein the inner cap has an airtight seal along the rim of the container body, a cap floor containing a first one-way air valve disposed to only permit airflow out of the container body, and a first cylinder defined by an annular wall projecting away from the container body.

The outer cap nests over the cylinder of the inner cap, and the outer cap has a cover, an exterior annular wall, and a piston member parallel to the exterior wall, wherein the exterior of the piston nests inside the first cylinder, and the exterior of the piston has an annular gasket forming an airtight seal in the between the piston and the first cylinder. The piston defines a second cylinder member comprising the interior of the piston that is in communication with the first cylinder. The outer cap cover has a second one-way air valve disposed to only permit air flow out of the second cylinder.

The outer cap and piston can reciprocate or slide on a longitudinal axis along the first cylinder, such that when the outer cap is drawn away from the container body in an outward reciprocal stroke, a vacuum is created in the first cylinder that draws air out of the container body through the first one-way valve to create a vacuum in the container body.

In an inward reciprocal stroke, the outer cap is pushed towards the container body, and the first one-way air valve blocks the equilibration of air pressure in the container body thereby leaving reduced air pressure in the container body, and the second one-way air valve vents the second cylinder to equalize the air pressure in the first cylinder. The outer cap may be reciprocated one or more times to create a vacuum from the reduced air pressure in the container body.

In an embodiment, the container body has one or more dividers permitting different specific materials to be stored in the container while minimizing mixing.

In an embodiment, the outer cap further comprises a metal plate disposed to make an audible clicking sound when there is a substantial vacuum in the first and second cylinders which is indicative of a substantial vacuum in the interior of the container body.

In an embodiment, the outer cap is rotatable relative to the inner cap, and wherein in a first rotated position, the outer cap is locked and cannot reciprocate, and in a second rotated position, the outer cap is unlocked and can reciprocate.

In an embodiment, the cap apparatus is left in place during storage.

DETAILED DESCRIPTION

Figure 9:
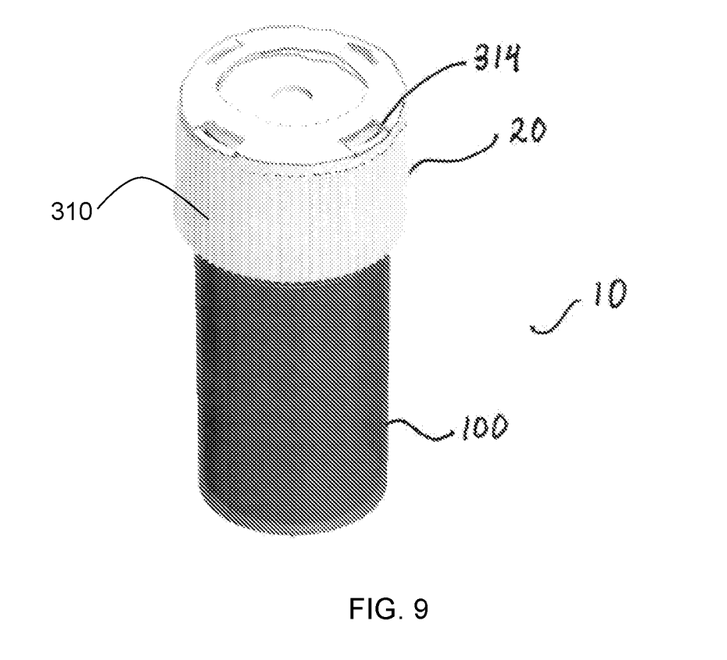
FIG. 9 is a perspective view of the complete apparatus.

As defined herein, the terms "up", "down," "above," and "below" are all descriptors of relative positions of parts when the inventive container 10 is sitting on a surface, for example a table, and oriented as shown in FIG. 9, with the bottom of container 10 resting upright on a surface, and the cap 20 on top of the overall apparatus. In an embodiment, the container body resembles a conventional plastic bottle or jar that is designed to sit upright on a surface.

In an embodiment of this invention, as shown in the figures, a container 10 is provided for storing an air sensitive material, comprising a container body 100 for storing the material and a cap apparatus 20. The cap apparatus contains two major components, an inner cap 200 and an outer cap 300. The cap apparatus can pump air out of the interior of the container body, powered by the hands of a user, to create a vacuum on the interior of the container body.

Figure 1:
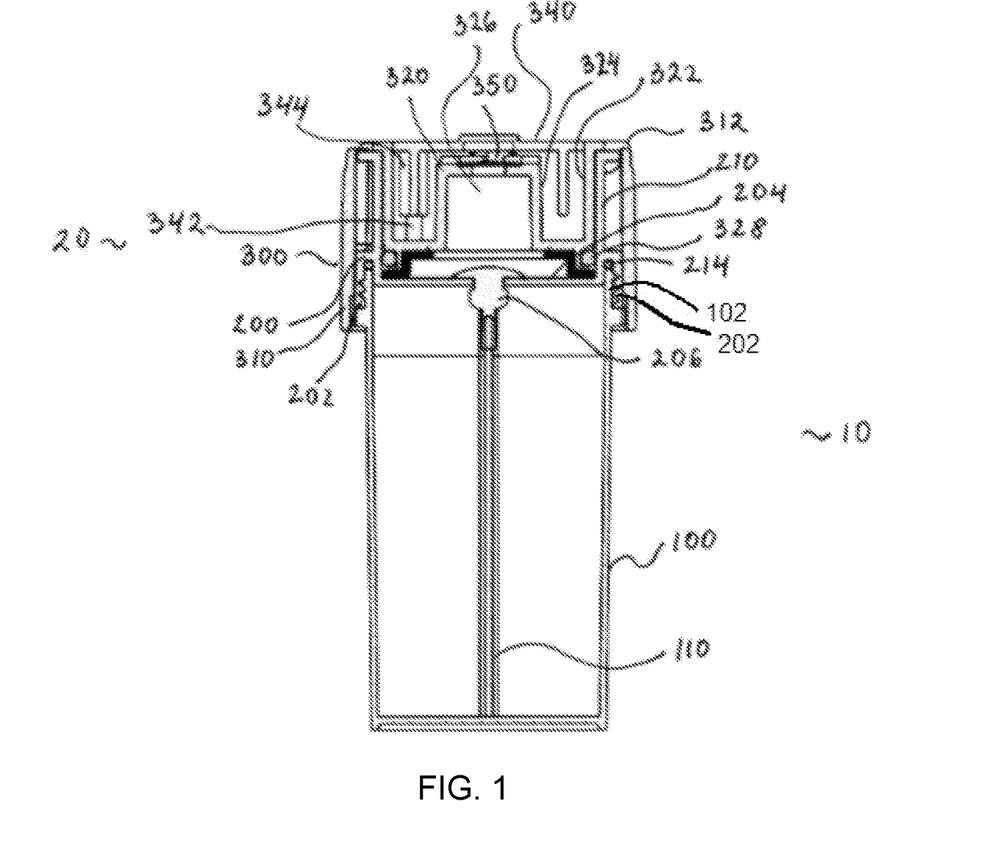
FIG. 1 is a cross-sectional view showing an embodiment of the inventive apparatus with the outer cap depressed downwardly.

FIG. 1 is a cross-sectional view showing the container body 100, with a mouth portion having outer threads 102 that engage corresponding threads 202 of the inner cap 200, thereby mating inner cap 200 to 100. In an embodiment, an O-ring seal 214 is disposed adjacent to threads 202 in 200 such that the O-ring forms an airtight seal around the threaded connection of the container body and inner cap 200.

Inner cap 200 has floor section 204 that has an integral one-way air valve 206. In an embodiment, air valve 206 is an elastomeric member disposed within a perforation (205) in floor section 204 with a flap on the top side of the floor such that air can only flow in one direction, i.e., out of the interior of the chamber body 100.

Inner cap 200 further includes a first cylinder 220 defined by an annular wall 210 projecting away from the container body. In the embodiment illustrated in the figures, cap 200 is shown with upper tabs 212, lower tabs 207 and upper lip 216.

Figure 2:
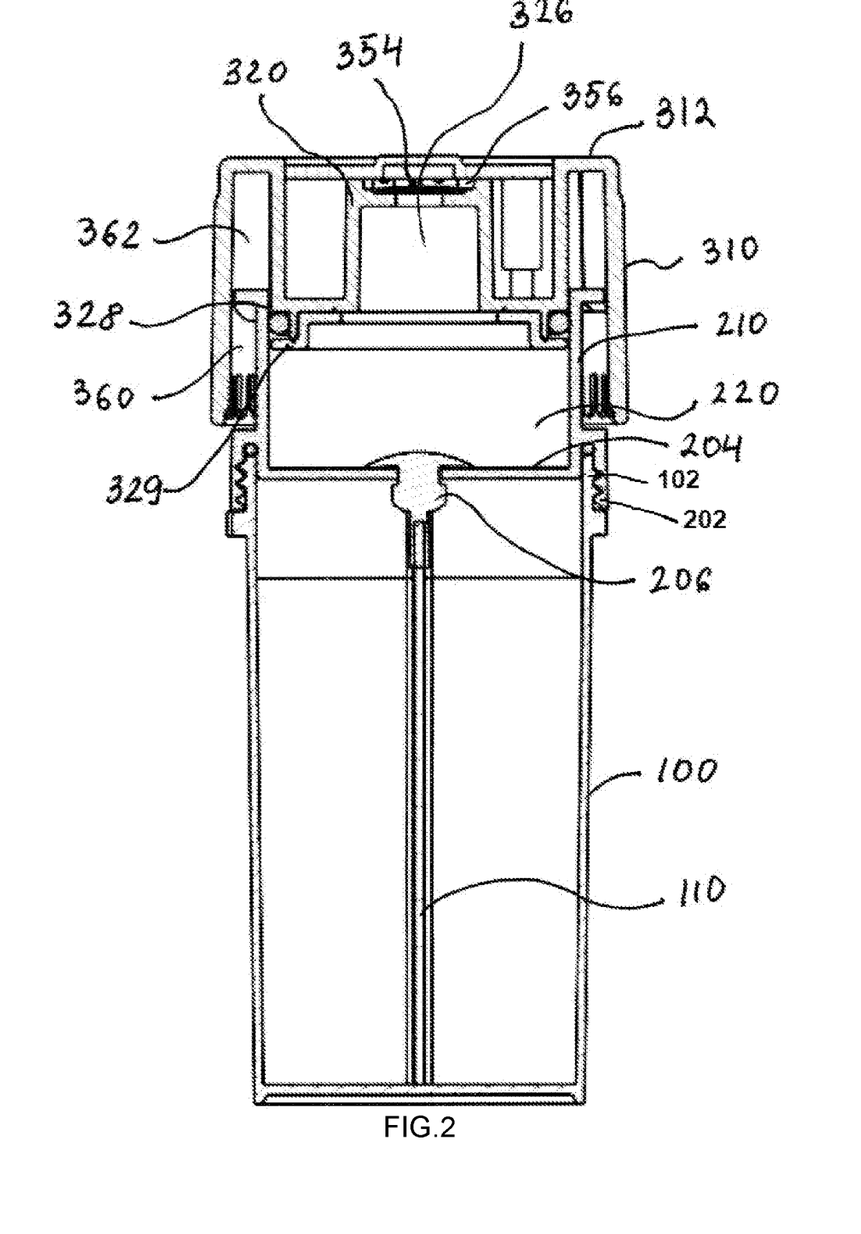
FIG. 2 is a cross-sectional view showing an embodiment of the inventive apparatus with the outer cap in an upward position.
Figure 3:
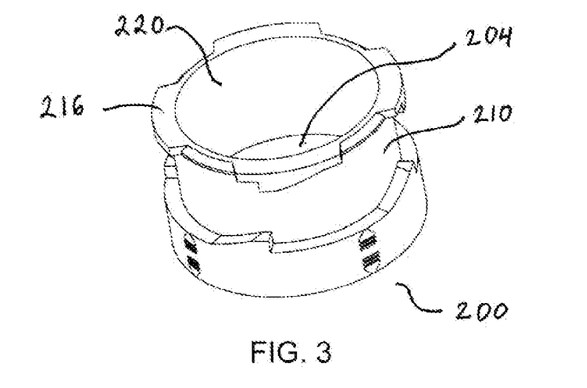
FIG. 3 is a perspective of the inner cap.
Figure 4:
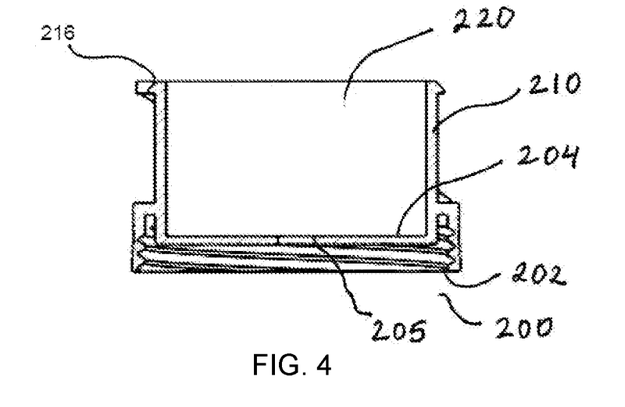
FIG. 4 is a cross-sectional view of the inner cap.
Figure 5:
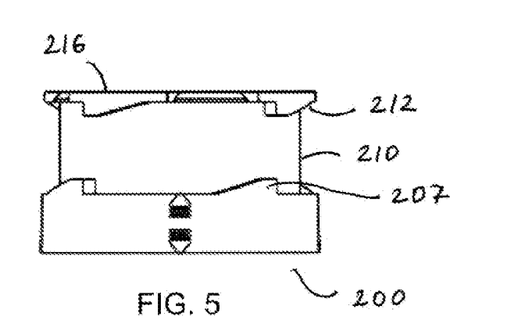
FIG. 5 is an elevation view of the of the inner cap.

Outer cap 300 has an annular wall 310 defining the exterior skirt of the outer cap, an annular lip section 312, and a cover member 340 that forms the top surface of the cap. The outer cap member 300 further includes a hollow piston member 320 having an outer wall 322 and an inner wall 324, whereby the interior of the piston defines a second cylinder 326 that is in fluid communication with the first cylinder 220 (FIG. 2). The piston outer wall 322 further includes a piston O-ring gasket 328 that forms an airtight seal between walls 210 and 322. In an embodiment shown in the figures, gasket 328 is supported in position with gasket seat 329.

Figure 8:
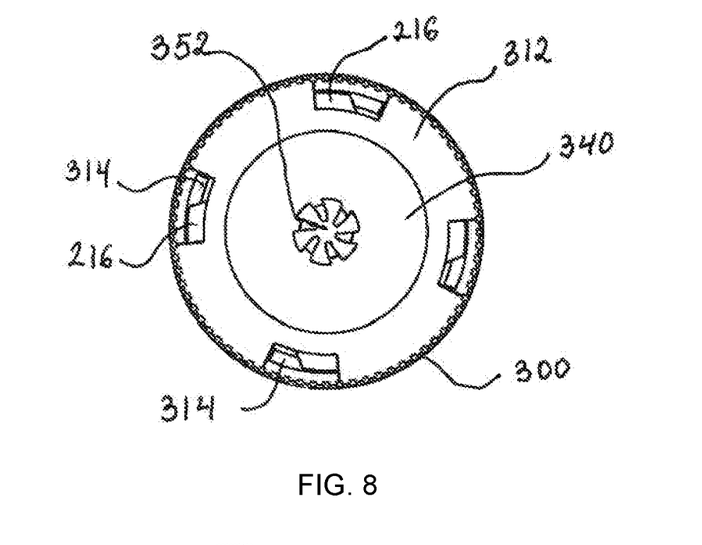
FIG. 8 is a top view of the apparatus, looking down.

The cover 340 further includes a second one-way air valve 350 that only permits air flow out of the interior of cap 20, i.e., this valve only permits air to flow from cylinder 326 and permits cylinder 326 to equilibrate to atmospheric pressure when outer cap 300 is in the down position. Air valve 350 comprises metal plate disc 354 that is seated with annular seal 356, that may be, for example, a flexible silicon seal. Air vents 352 (FIG. 8) are provided. In operation, when a vacuum is developing in cylinder 326, valve 350 blocks air flow into cylinder 326. When outer cap 300 is depressed, the pressure in cylinder 326 increases, and valve 350 permits the interior of cylinder 326 to equilibrate its air pressure.

In a further embodiment, as shown in the figures, cover 340 is a detachable member from cap 300, and is supported in place by a set of four posts 342 that project upward from a bottom floor of the of cap 300 and nest in post receptacles 344 that project downward from the bottom surface of cap 340.

Figure 6:
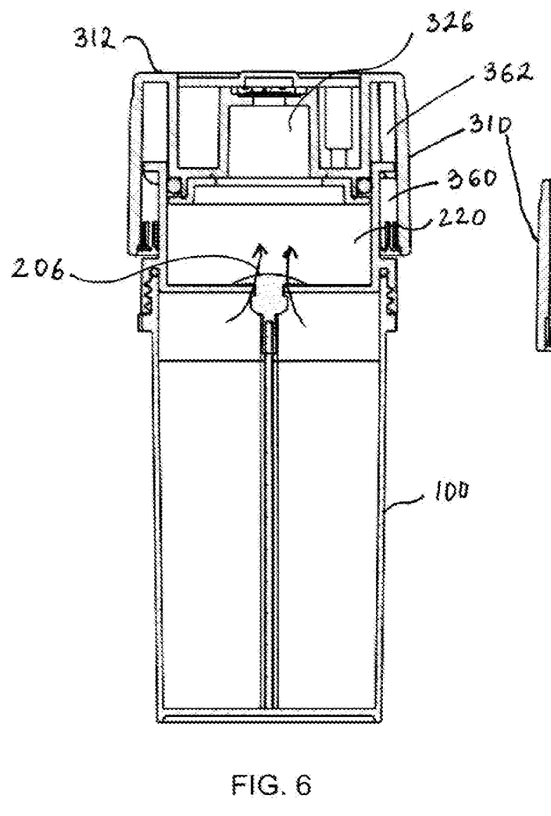
FIG. 6 illustrates the air flow in the outward stroke of the reciprocating pumping action.

In operation, the normal resting position of the invention is a shown in FIG. 1, which shows outer cap 300 depressed all the way down. To operate the apparatus, a user would grip the container body in one hand, and pull the outer cap section 300 upward and away from the container body with their other hand. The greatest extent of the slidable reciprocation of outer cap 300 is shown in FIG. 6. This outward stroke draws piston 320 upward, which expands the volume in cylinder 220, thereby creating a zone of reduced air pressure in cylinder 220. This draws air from the interior of container body 100 into cylinder 220 through the one-way air valve 206 to equilibrate the air pressure between container body 100 into cylinder 220. The air flow during this outward stroke is shown by arrows in FIG. 6.

In the downward reciprocal motion, outer cap 300 is pushed downward by the user, and the flow of air back into container body 100 is blocked because valve 206 will not permit air to flow back into the interior of container body 100. The air pressure in the cylinder 326 is equilibrated by one-way air valve 350 that permits air flow out of cylinder 326. Thus, the user can pump air out of the interior of container body 100 by employing a reciprocating action of the outer cap 300 relative to the inner cap 200.

Figure 7:
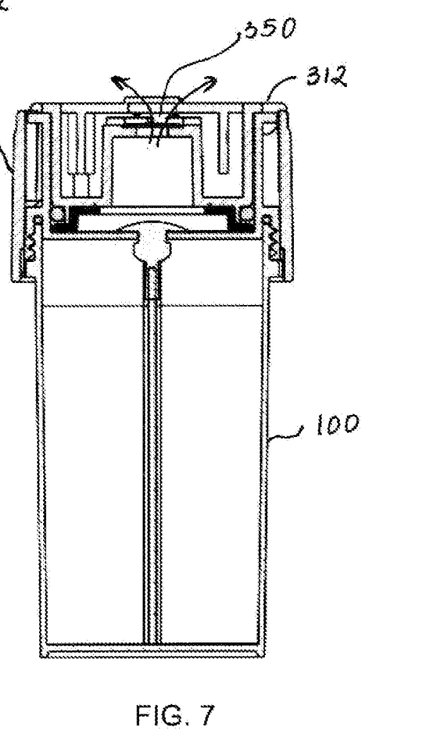
FIG. 7 illustrates the air flow in the inward stroke of the reciprocating pumping action.

As illustrated in the Figures, outer cap 300 has an annular lip or rim section 312, with four vent openings 314. These openings assist in the equalization of air pressure in the interstitial space 362. The engagement of inner cap 200 with outer cap 300 creates two interstitial spaces, lower space 360 and upper space 362. As illustrated in FIGS. 6 and 7, when the upper cap is in the up position (FIG. 6), the two interstitial spaces are divided by lip 216 that is part of the lower cap. Below lip 216 is interstitial space 360, and above lip 216 is interstitial space 362. When the outer cap 300 is depressed, interstitial space 362 is compressed and may not be present at all in the downward position as shown in FIG. 7. The vent openings 314 equilibrate the air pressure in interstitial space 362 during the reciprocating motion of the upper cap 300. Likewise, the air pressure in interstitial space 360 is equilibrated because there is a gap between outer wall 310 and lower cap 200.

The entire cap assembly 20 can be rotated about the threaded connection formed by 102 and 202 to relieve the vacuum in the in interior of container body 100, and remove the entire cap assembly 20 to add or remove the contents of the container body. However, the apparatus 10 is generally intended so that the entire cap apparatus remains on the container body during storage with a vacuum in the interior. If the materials and fit of the entire apparatus are of high quality, there is no reason why the vacuum should not persist for an extended period. In an embodiment, the cap assembly 20 may be child resistant, and difficult for a young child to detach. In an embodiment, child-resistance may be inherent from the vacuum in the container body that makes unscrewing of the cap assembly difficult, requiring the strength of an adult. Once the outer cap is pushed down, it rotates freely clockwise and counterclockwise and the container would not open. Opening the container requires the outer cap to be pulled up and twisted counterclockwise. In another embodiment, the child proof mechanism can include notches on the cap assembly that interlock with notches on the container.

In an embodiment, one or more dividers 110 may be provided to assist in the separation of different materials to be stored on the container body.

In an embodiment, as illustrated in the figures, air valve 350 includes a thin metal plate, for example, made from steel, that can deform slightly and make an audible "click" when a certain degree of vacuum is achieved. In an embodiment, inner cap 200 has a series of upper tabs 212 and lower tabs 207 that engage corresponding features in outer cap 300. These tabs permit the outer cap 300 to lock relative to inner cap 200 according to a rotatable position of the inner and outer caps. Thus, in one rotated position, the tabs 207 and 212 engage the outer cap to prevent the reciprocating action. In a second rotated position, the tabs 207 and 212 are not engaged with the outer cap, and the outer cap can reciprocate to provide the inventive pumping action.

Figures 10A, 10B:
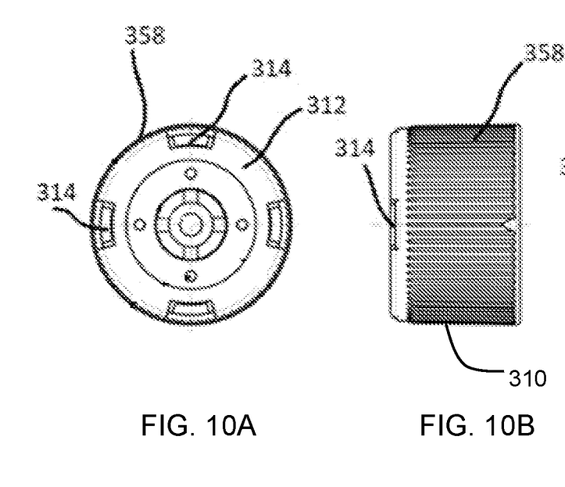
FIG. 10A is a view of the top of the outer cap of the apparatus.
FIG. 10B is a side view of the outer cap.
Figure 10C:
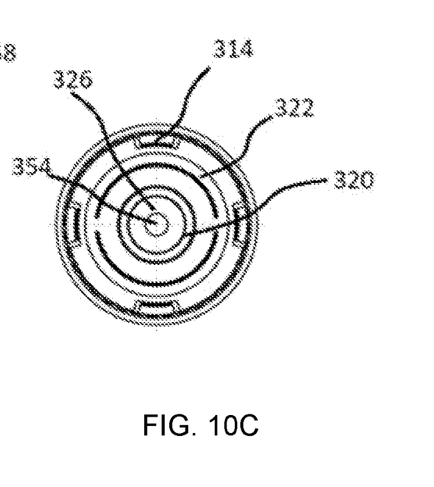
FIG. 10C is a view of the inside of outer cap.

FIGS. 10A-10C are illustrations of the outer cap 300. As illustrated in FIG. 10A, showing the outer cap 300 without the cover member 340, the outer cap 300 has an annular lip or rim section 312, with four vent openings 314. FIG. 10B is a side view of the exterior skirt 310 of the outer cap 300 has ribs 358 for easy gripping. In FIG. 10C the outer cap 300 is shown as viewed from below with the metal plate 354 shown at the center of the cylinder 326 formed by the hollow piston inner wall 324.

Figure 11:
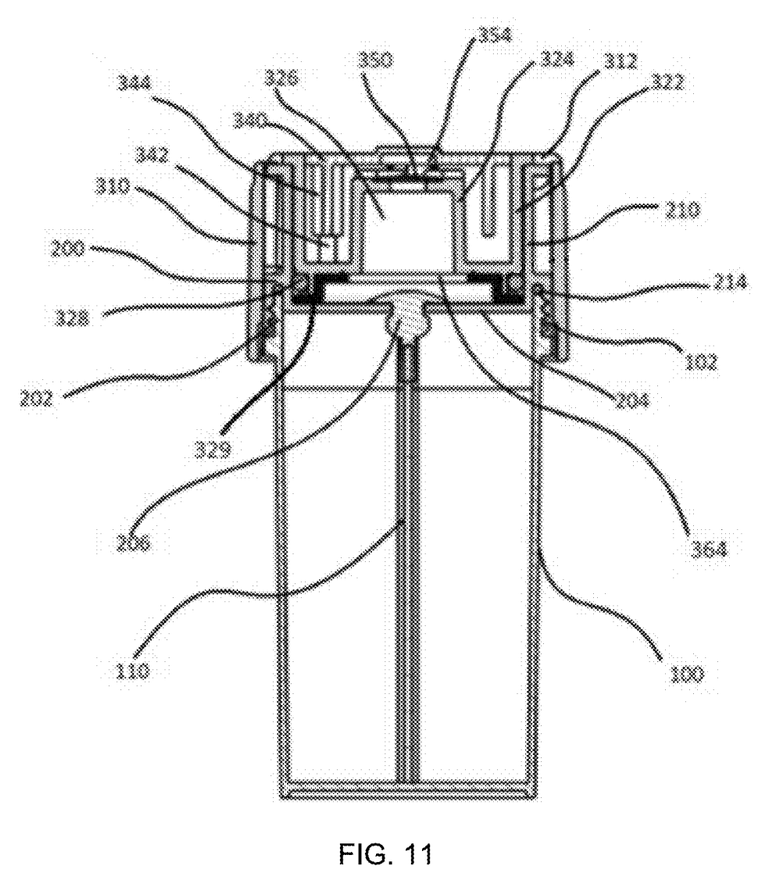
FIG. 11 is a cross section view of an embodiment of the inventive apparatus with an activated charcoal insert.

As illustrated in FIG. 11, the outer cap 300 can have an activated carbon cloth insert 364 for trapping odors. The activated carbon cloth insert 364 is made of a layer of knitted activated carbon cloth that may be laminated to a top and bottom layer of polyester fabric. In an embodiment, the surface density of the knitted fabric is 110 g/m$^2$ with carbon tetrachloride activity of 55-70% ww, thickness of 0.4 mm and air permeability of 75 cm$^3$/s/cm$^2$ at 10 mm w.g. (water pressure). An activated carbon cloth insert that may be used in this invention is manufactured by Calgon Carbon and may have the part designation "FM30K." The activated carbon insert absorbs organic or inorganic molecules and acts as an anti-odor filter and a protective layer. In the illustrated embodiment, the activated carbon cloth insert 364 is seated over the opening of the hollow piston cylinder 326, distal from the metal plate 354 in a way that it completely covers the opening so that the air flowing out of the first cylinder 220 passes through the activated carbon cloth insert 364, which filters the odors emitted from the container's content.

Figure 12:
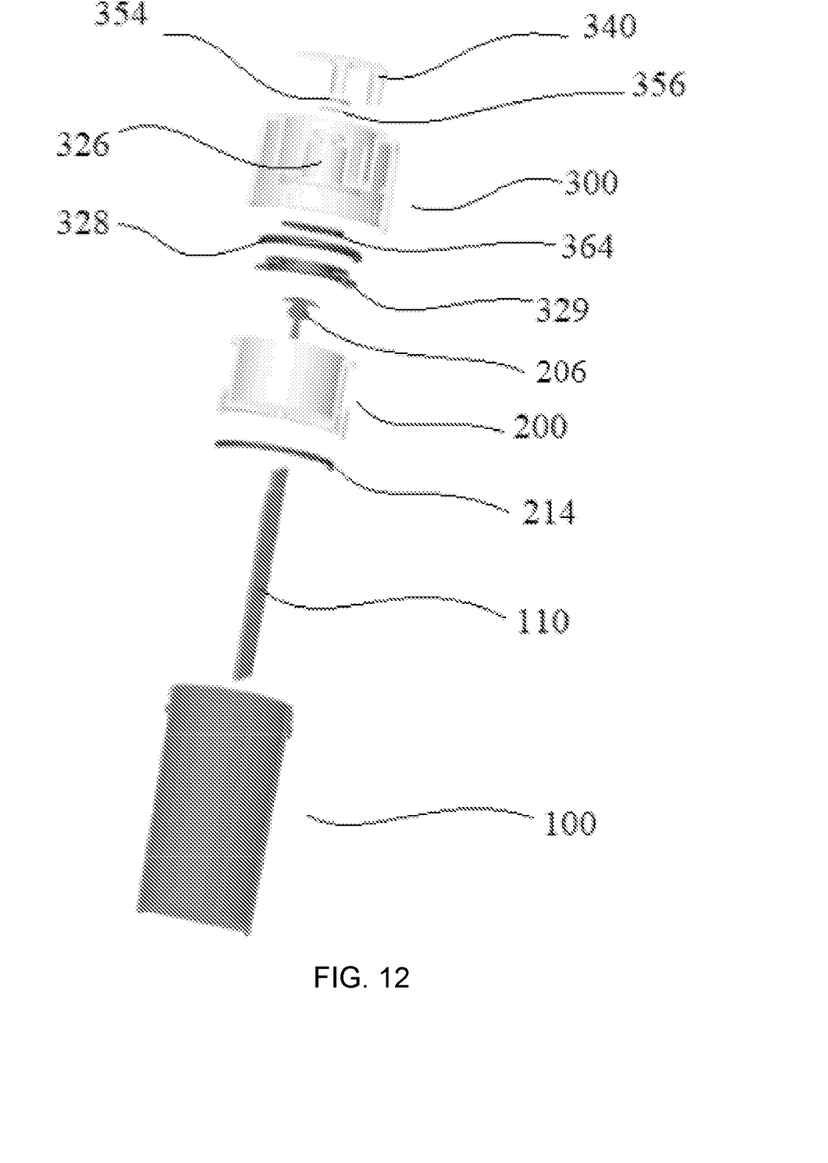
FIG. 12 is a perspective exploded cross section view of an embodiment of the inventive apparatus.

FIG. 12 is a perspective exploded cross section view of an embodiment of the inventive apparatus 10, showing the position outer cap 300 in relation to the inner cap 200 in creation to the container body 100. The metal clip plate 354 and the charcoal insert 364 are positioned at the two distal sides of the hollow cylinder 326.

The solid material may be any air sensitive material that has a tendency to degrade or oxidize when exposed to air. This can include, for example, coffee, herbs, spices, and cannabis. The storage of such a material in a vacuum will tend to reduce the degradation of the material, and allow it to remain fresh for a longer period of time.

The invention claimed is:

1. A container for storing an air sensitive solid material, comprising a container body for storing the solid material and a cap apparatus, wherein the cap apparatus comprises:
   a. An inner cap with a threaded connection to a mouth portion of the container body, wherein the inner cap has an airtight seal along a rim of the container body, a cap floor containing a first one-way air valve disposed to only permit airflow out of the container body, and a first cylinder defined by an annular wall of the inner cap projecting away from the container body;
   b. An outer cap that nests over the cylinder of the inner cap, wherein the outer cap has a cover, an exterior annular wall, and a piston member parallel to the exterior wall, wherein an exterior of the piston nests inside the first cylinder, and the exterior of the piston has an annular gasket forming an airtight seal between the piston and the first cylinder;
   c. wherein the piston defines a second cylinder member comprising an interior of the piston that is in communication with the first cylinder;
   d. wherein the outer cap cover has a second one-way air valve disposed to only permit air flow out of the second cylinder;
   e. wherein the outer cap and piston can reciprocate on a longitudinal axis along the first cylinder, such that when the outer cap is drawn away from the container body in an outward reciprocal stroke, a vacuum is created in the first cylinder that draws air out of the container body through the first one-way valve to create a vacuum in the container body;
   f. wherein when the outer cap is pushed towards the container body in an inward reciprocal stroke, the first one-way air valve blocks the equilibration of air pressure in the container body thereby leaving reduced air pressure in the container body, and the second one-way air valve vents the second cylinder to equalize the air pressure in the first cylinder; and
   g. wherein the outer cap is reciprocated one or more times to create a vacuum from the reduced air pressure in the container body.

2. The container according to claim 1, wherein the container body has one or more dividers permitting different specific materials to be stored in the container while minimizing mixing.

3. The container according to claim 1, wherein the outer cap further comprises a metal plate disposed to make an audible clicking sound when there is a substantial vacuum in the first and second cylinders which is indicative of a substantial vacuum in the interior of the container body.

4. The container according to claim 1, wherein the outer cap is rotatable relative to the inner cap, and wherein in a first rotated position, the outer cap is locked and cannot reciprocate, and in a second rotated position, the outer cap is unlocked and can reciprocate.

5. The container according to claim 1, wherein the outer cap has a child proof mechanism.

6. A container for storing an air sensitive material, comprising a container body for storing the solid material and a cap apparatus, wherein the cap apparatus comprises:
   a. An inner cap with a threaded connection to a mouth portion of the container body, wherein the inner cap has an airtight seal along a rim of the container body, a cap floor containing a first one-way air valve disposed to only permit airflow out of the container body, and a first cylinder defined by an annular wall projecting away from the container body;
   b. An outer cap that nests over the cylinder of the inner cap, wherein the outer cap has a cover, an exterior annular wall, and a piston member parallel to the exterior wall, wherein an exterior of the piston nests inside the first cylinder, and the exterior of the piston has an annular gasket forming an airtight seal between the piston and the first cylinder;
   c. wherein the piston defines a second cylinder member comprising an interior of the piston that is in communication with the first cylinder allowing air to flow between the two cylinders through an activated carbon cloth insert;
   d. wherein the outer cap cover has a second one-way air valve disposed to only permit air flow out of the second cylinder;
   e. wherein the outer cap has the activated carbon cloth insert disposed over an opening of the second cylinder distal from the second one-way valve;
   f. wherein the outer cap and piston can reciprocate on a longitudinal axis along the first cylinder, such that when the outer cap is drawn away from the container body in an outward reciprocal stroke, a vacuum is created in the first cylinder that draws air out of the container body through the first one-way valve to create a vacuum in the container body;
   g. wherein when the outer cap is pushed towards the container body in an inward reciprocal stroke, the first one-way air valve blocks the equilibration of air pressure in the container body thereby leaving reduced air pressure in the container body, and the second one-way air valve vents the second cylinder to equalize the air pressure in the first cylinder; and h. wherein the outer cap is reciprocated one or more times to create a vacuum from the reduced air pressure in the container body.

7. The container according to claim 6, wherein the container body has one or more dividers permitting different specific materials to be stored in the container while minimizing mixing.

8. The container according to claim 6, wherein the outer cap further comprises a metal plate disposed to make an audible clicking sound when there is a substantial vacuum in the first and second cylinders which is indicative of a substantial vacuum in the interior of the container body.

9. The container according to claim 6, wherein the outer cap is rotatable relative to the inner cap, and wherein in a first rotated position, the outer cap is locked and cannot reciprocate, and in a second rotated position, the outer cap is unlocked and can reciprocate.

\* \* \* \* \*